United States Patent
Ramsby et al.

(10) Patent No.: US 9,934,614 B2
(45) Date of Patent: Apr. 3, 2018

(54) FIXED SIZE AUGMENTED REALITY OBJECTS

(71) Applicant: Microsoft Technology Licensing, LLC, Redmond, WA (US)

(72) Inventors: Scott Ramsby, Kirkland, WA (US); Dan Osborn, Woodinville, WA (US); Shawn Wright, Sammamish, WA (US); Anatolie Gavriliuc, Kirkland, WA (US); Forest Woodcroft Gouin, Seattle, WA (US); Megan Saunders, Kirkland, WA (US); Jesse Rapczak, Kirkland, WA (US); Stephen Latta, Seattle, WA (US); Adam G. Poulos, Sammamish, WA (US); Daniel McCulloch, Kirkland, WA (US); Wei Zhang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 327 days.

(21) Appl. No.: 14/717,771

(22) Filed: May 20, 2015

(65) Prior Publication Data
US 2015/0254905 A1 Sep. 10, 2015

Related U.S. Application Data

(63) Continuation-in-part of application No. 13/485,511, filed on May 31, 2012, now abandoned.
(Continued)

(51) Int. Cl.
*G06T 19/00* (2011.01)
*G06T 3/40* (2006.01)
(Continued)

(52) U.S. Cl.
CPC .......... *G06T 19/006* (2013.01); *G02B 27/017* (2013.01); *G02B 27/2228* (2013.01);
(Continued)

(58) Field of Classification Search
None
See application file for complete search history.

(56) References Cited

U.S. PATENT DOCUMENTS 5,699,535 A    12/1997   Amro
5,905,525 A *   5/1999   Ishibashi ................ H04N 5/232
                                                                  345/8
(Continued)

OTHER PUBLICATIONS

IPEA European Patent Office, Second Written Opinion Issued in PCT Application No. PCT/US2016/012778, dated Dec. 8, 2016, WIPO, 11 pages.
(Continued)

*Primary Examiner* — Ryan D McCulley
(74) *Attorney, Agent, or Firm* — Alleman Hall Creasman & Tuttle LLP

(57) ABSTRACT

An example wearable display system includes a controller, a left display to display a left-eye augmented reality image with a left-eye display size at left-eye display coordinates, and a right display to display a right-eye augmented reality image with a right-eye display size at right-eye display coordinates, the left-eye and right-eye augmented reality images collectively forming an augmented reality object perceivable at an apparent real world depth by a wearer of the display system. The controller sets the left-eye display coordinates relative to the right-eye display coordinates as a function of the apparent real world depth of the augmented reality object. The function maintains an aspect of the left-eye and right-eye display sizes throughout a non-scaling range of apparent real world depths of the augmented reality
(Continued)

object, and the function scales the left-eye and right-eye display sizes with changing apparent real world depth outside the non-scaling range.

20 Claims, 10 Drawing Sheets

Related U.S. Application Data

(60) Provisional application No. 62/105,672, filed on Jan. 20, 2015.

(51) Int. Cl.
*G02B 27/01* (2006.01)
*G02B 27/22* (2018.01)
*G02B 27/00* (2006.01)

(52) U.S. Cl.
CPC ............ *G06T 3/40* (2013.01); *G02B 27/0093* (2013.01); *G02B 2027/014* (2013.01); *G02B 2027/0132* (2013.01); *G02B 2027/0138* (2013.01); *G02B 2027/0178* (2013.01)

(56) References Cited

U.S. PATENT DOCUMENTS

| | | | |
|---|---|---|---|
| 6,198,484 B1 * | 3/2001 | Kameyama | G06T 15/10 345/419 |
| 6,466,230 B1 | 10/2002 | Edmark | |
| 6,614,427 B1 | 9/2003 | Aubrey | |
| 6,934,743 B2 | 8/2005 | Huat | |
| 6,987,512 B2 | 1/2006 | Robertson et al. | |
| 7,068,403 B2 | 6/2006 | Kitamura | |
| 7,190,496 B2 | 3/2007 | Klug et al. | |
| 7,589,759 B1 | 9/2009 | Freeman et al. | |
| 7,708,640 B2 | 5/2010 | Burak et al. | |
| 7,839,548 B2 | 11/2010 | Schwerdtner | |
| 8,027,071 B2 | 9/2011 | Schwerdtner | |
| 8,154,781 B2 | 4/2012 | Kroll et al. | |
| 8,334,889 B2 | 12/2012 | Blanche et al. | |
| 8,665,260 B2 | 3/2014 | McCrae et al. | |
| 8,799,810 B1 | 8/2014 | Wheeler | |
| 8,812,475 B2 | 8/2014 | Branca et al. | |
| 2002/0122585 A1 | 9/2002 | Swift et al. | |
| 2006/0139711 A1 | 6/2006 | Leister et al. | |
| 2006/0173338 A1 | 8/2006 | Ma et al. | |
| 2008/0246759 A1 | 10/2008 | Summers | |
| 2009/0313584 A1 | 12/2009 | Kerr et al. | |
| 2011/0216160 A1 | 9/2011 | Martin | |
| 2011/0242134 A1 | 10/2011 | Miller et al. | |
| 2012/0069131 A1 | 3/2012 | Abelow | |
| 2012/0113092 A1 | 5/2012 | Bar-Zeev et al. | |
| 2012/0257795 A1 | 10/2012 | Kim et al. | |
| 2013/0050258 A1 | 2/2013 | Liu et al. | |
| 2013/0050432 A1 | 2/2013 | Perez et al. | |
| 2013/0162637 A1 | 6/2013 | Son | |
| 2013/0222548 A1 | 8/2013 | Yang et al. | |
| 2013/0246967 A1 | 9/2013 | Wheeler et al. | |
| 2013/0326364 A1 | 12/2013 | Latta et al. | |
| 2013/0328927 A1 | 12/2013 | Mount et al. | |
| 2013/0335301 A1 | 12/2013 | Wong et al. | |
| 2014/0043322 A1 * | 2/2014 | Fulks | G06T 19/006 345/419 |
| 2014/0049559 A1 | 2/2014 | Fleck et al. | |
| 2014/0192084 A1 | 7/2014 | Latta et al. | |
| 2014/0293385 A1 | 10/2014 | Smithwick | |
| 2014/0306866 A1 | 10/2014 | Miller et al. | |
| 2015/0103003 A1 * | 4/2015 | Kerr | G06F 3/013 345/158 |
| 2015/0279105 A1 * | 10/2015 | Hanai | G06F 1/1686 345/633 |
| 2015/0381974 A1 * | 12/2015 | Hoffman | G06T 19/006 345/419 |
| 2016/0131908 A1 * | 5/2016 | Fateh | G06F 3/147 345/633 |
| 2016/0182613 A1 * | 6/2016 | Brune | H04L 67/10 709/217 |

OTHER PUBLICATIONS

Bimber, O. et al., "Interacting with Augmented Holograms", In Proceedings of SPIE, vol. 5742, Jan. 26, 2005, 14 pages.
Caudell, T. et al., "Augmented Reality: An Application of Heads-up Display Technology to Manual Manufacturing Processes", In Proceedings of the Twenty-fifth Hawaii International Conference on System Sciences, Jan. 1992, 11 pages.
Halle, M. et al., "The Ultragram: A Generalized Holographic Stereogram", In Proceedings of the SPIE Practical Holography, Feb. 1991, 13 pages.
Plesniak, W. et al., "Coincident Display Using Haptics and Holographic Video", In Proceedings of ACM SIGCHI Conference on Human Factors in Computing Systems, Apr. 1998, 8 pages.
Reichelt, S. et al., "Holographic 3-D Displays—Electro-Holography within the Grasp of Commercialization", Advances in Lasers and Electro Optics, Apr. 2010, 29 pages.
Wientapper, F. et al., "A Camera-Based Calibration for Automotive Augmented Reality Head-Up-Displays", IEEE International Symposium on Mixed and Augmented Reality, Oct. 2013, 9 pages.
"Portal 2 Gameplay (PC HD)" via YouTube, <https://www.youtube.com/watch?v=XeVmSEvhzQU>, Published: Apr. 21, 2011.
"How Head Tracking makes Holographic Displays", Published on: Jan. 29, 2013 Available at: http://doc-ok.org/?p=337.
"EyeLiner™", Retrieved on: Jan. 21, 2015 Available at: http://musion.com/eyeliner/.
"DreamocXL—3D Holographic Product Display", Retrieved on: Jan. 21, 2015 Available at: https://www.youtube.com/watch?v=SLMrdAJyodl.
ISA European Patent Office, International Search Report and Written Opinion issued in Application No. PCT/US2016/012778, dated Apr. 5, 2016, WIPO, 14 pages.
IPEA European Patent Office, International Preliminary Report on Patentability Issued in PCT Application No. PCT/US2016/012778, dated Apr. 18, 2017, WIPO, 12 Pages.

* cited by examiner

FIXED SIZE AUGMENTED REALITY OBJECTS

CROSS REFERENCE TO RELATED APPLICATIONS

This application claims priority to U.S. Ser. No. 62/105,672, filed Jan. 20, 2015, and is a continuation-in-part of U.S. Ser. No. 13/485,511, filed May 31, 2012, the entirety of each of which is hereby incorporated herein by reference.

BACKGROUND

Stereoscopic displays can simultaneously present images to the left and right eyes of a viewer. By presenting different views of the same object at different positions in the right and left eye fields of view, a three-dimensional perception of the object can be achieved.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An example wearable, head-mounted display system includes a left near-eye, see-through display configured to display a left-eye augmented reality image with a left-eye display size at left-eye display coordinates, a right near-eye, see-through display configured to display a right-eye augmented reality image with a right-eye display size at right-eye display coordinates, the left-eye augmented reality image and right-eye augmented reality image collectively forming an augmented reality object perceivable at an apparent real world depth by a wearer of the head-mounted display system, and a controller. The controller sets the left-eye display coordinates relative to the right-eye display coordinates as a function of the apparent real world depth of the augmented reality object. The function maintains an aspect of the left-eye display size and the right-eye display size throughout a non-scaling range of apparent real world depths of the augmented reality object, and the function scales the left-eye display size and the right-eye display size with changing apparent real world depth of the augmented reality object outside the non-scaling range of apparent real world depths.

DETAILED DESCRIPTION

Near-eye see-through display devices may be configured to display augmented reality images to provide the illusion that augmented reality objects, sometimes referred to as holograms, are present in the real world environment surrounding the near-eye display device. In order to mimic how real objects are perceived by a wearer of the display device, the displayed augmented reality objects may scale in size as a perceived depth of the augmented reality object changes. However, it may be desirable to maintain one or more aspects of the augmented reality object size, even as the depth of the augmented reality object changes, in order to preserve visibility of the augmented reality object. Such size preservation may lessen the realism of the object, as the object will not scale exactly as a real object would scale. However, such size preservation may make it easier to see objects that would be too small or too large if scaled as a real object would scale and/or may provide an increased ability to read or otherwise interact with content displayed on the object.

According to embodiments disclosed herein, augmented reality content, such as user interface elements, holographic icons, or the like, may be displayed on a near-eye, see-through display device according to various respective scaling functions that define how the augmented reality content size is scaled with respect to the perceived depth of the augmented reality content. In some examples, different types of augmented reality content may be sized according to different scaling functions. For example, user interface control elements, such as cursors, may be maintained at the same perceived size throughout a range of depths, while holograms displayed as part of an immersive game environment may be scaled linearly with changing depth. In this way, the user interface control element may be maintained at a size that is visible to a user of the display device, even if the user interface control element is displayed at a relatively distant apparent depth.

As explained above, such scaling functions may also increase a user's ability to visualize content displayed on an augmented reality object. For example, a holographic newspaper floating above a table across the room from the user may itself be visible, but the headlines on the newspaper may only be visible if the scaling techniques as described above are employed.

As another example, a user may have difficulty noticing the 3D effect of a (simulated) stereoscopic 3D movie played on a holographic television across the room. With the scaling described herein, the television may become large enough in the user's view that he or she is able to see and appreciate the movie's stereoscopic 3D effect.

Figure 1:
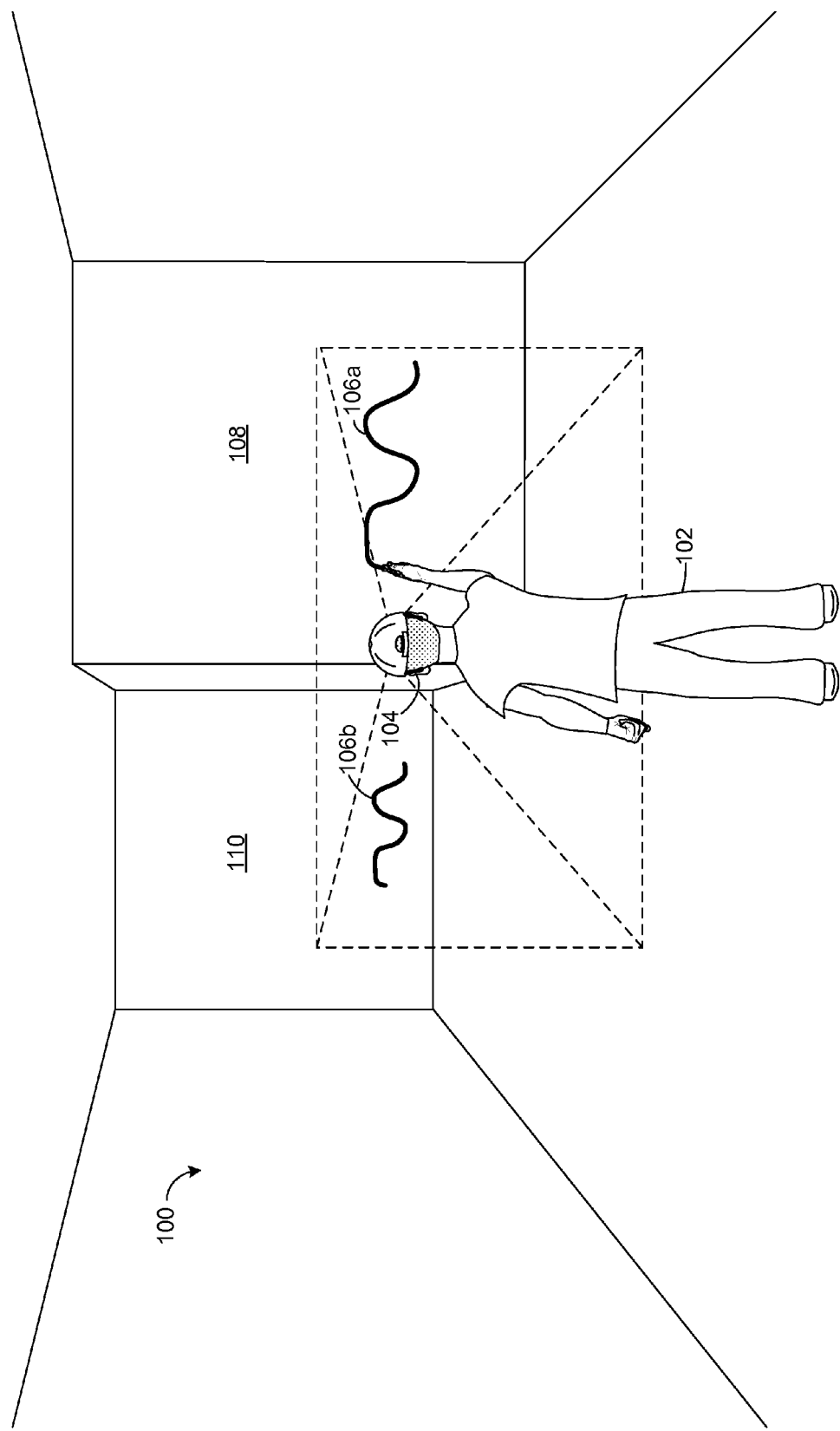
FIG. 1 shows an example environment including a user wearing a near-eye, see-through display device.

As a still further example, when a user walks relatively close to a fixed-size holographic television object displaying a (simulated) stereoscopic 3D movie, scaling as described herein may allow the television to disable the stereoscopic 3D effect and substitute 2D video to prevent eyestrain and maximize viewer comfort. Alternatively, the holographic object could simply fade out the video content when the user is close to prevent the television from blocking out most of the user's view. FIG. 1 shows an example environment 100 in which a user 102 is wearing near-eye, see-through display device, herein embodied as a head-mounted display (HMD) 104. The HMD provides user 102 a see-through view of environment 100. The HMD also displays augmented reality images to the user. In one example, the HMD is a stereoscopic display device, wherein two separate augmented reality images are each displayed on respective left-eye and right-eye displays of the HMD. When viewed by a wearer of the HMD (e.g., user 102), the two augmented reality images collectively form an augmented reality object perceivable by the wearer as part of environment 100. FIG. 1 depicts example augmented reality objects 106a and 106b. However, it is to be understood that the depicted augmented reality objects are not visible to others in environment 100, and the augmented reality objects can only be seen by user 102 via HMD 104.

HMD 104 can display augmented reality images such that perceived augmented reality objects are body-locked and/or world-locked. A body-locked augmented reality object moves as the six-degree-of-freedom pose (i.e., 6DOF: x, y, z, yaw, pitch, roll) of HMD 104 changes. As such, a body-locked augmented reality object appears to occupy the same portion of the field of view of user 102 and appears to be at the same distance from user 102, even as the user moves, turns, etc.

On the other hand, a world-locked augmented reality object appears to remain in a fixed location relative to the surrounding environment. Even as a user moves and the user's perspective changes, a world-locked augmented reality object will appear to be in the same position/orientation relative to the surrounding environment. As an example, an augmented reality chess piece may appear to be on the same square of a real world chess board regardless of the vantage point from which a user views the chess board. To support a world-locked augmented reality object, an HMD may track the 6DOF pose of the HMD and a geometric mapping/modeling of surface aspects of the surrounding environment.

According to the present disclosure, the apparent real world-size of an augmented reality object, or portions of an augmented reality object, may be changed as a function of the apparent real world depth of the augmented reality object. In other words, the size of an augmented reality object may be increased as the augmented reality object is displayed at farther perceived distances, and the size of the augmented reality object may be decreased as the augmented reality object is displayed at nearer perceived distances. The scaling function may be tuned so that the augmented reality object, or portions of the augmented reality object, will occupy the same proportion of a user's field of view (FOV) regardless of the perceived distance at which the augmented reality object is displayed. That is, the apparent real world size of an augmented reality object, or a portion of an augmented reality object, may be increased or decreased to maintain the same angular size relative to the user.

In the example illustrated in FIG. 1, user 102 is creating an augmented reality drawing via gesture input. As shown, user 102 is creating a first drawing, depicted as augmented reality object 106a, along a first wall 108 that is relatively close to user 102 and HMD 104. One or more aspects of augmented reality object 106a may be set such that augmented reality object 106a is visible to user 102. For example, while the overall size of the augmented reality object 106a may be determined according to the gesture input of the user, the line thickness of the augmented reality object 106a may be set based on the distance between the user and the first wall 108 where the augmented reality object 106a is placed, in order to ensure that the augmented reality object is visible and to reduce eye strain of the user.

If the augmented reality object changes in apparent depth, for example if the augmented reality object is placed such that its apparent depth increases, one or more aspects of the augmented reality object may be maintained in order to maintain visibility of the object. As shown in FIG. 1, the drawing created by the user is moved to be at a greater apparent depth. The moved drawing, depicted as augmented reality object 106b, is placed on second wall 110, which is a farther distance from user 102 and HMD 104 than first wall 108. Accordingly, the apparent real world depth of the augmented reality object has increased, and thus the apparent real world size of the augmented reality object decreases, in order to provide the perception of three dimensions. However, the line thickness of the drawing is maintained, in order to maintain visibility of the drawing. As described herein, the line thickness of the drawings being maintained refers to the user-perceived line thickness being maintained. In some examples, maintaining the user-perceived line thickness may include adjusting one or more aspects of the actual displayed line.

As demonstrated in FIG. 1, some types of augmented reality objects may be scaled such that one or more aspects (e.g., line thickness) are constant throughout a range of different apparent depths. As such, when such objects are initially displayed at an apparent depth within that range, or when such objects are moved to an apparent depth within that range, the aspect of the object may be set to a predetermined level that is constant throughout the range.

Figure 2:
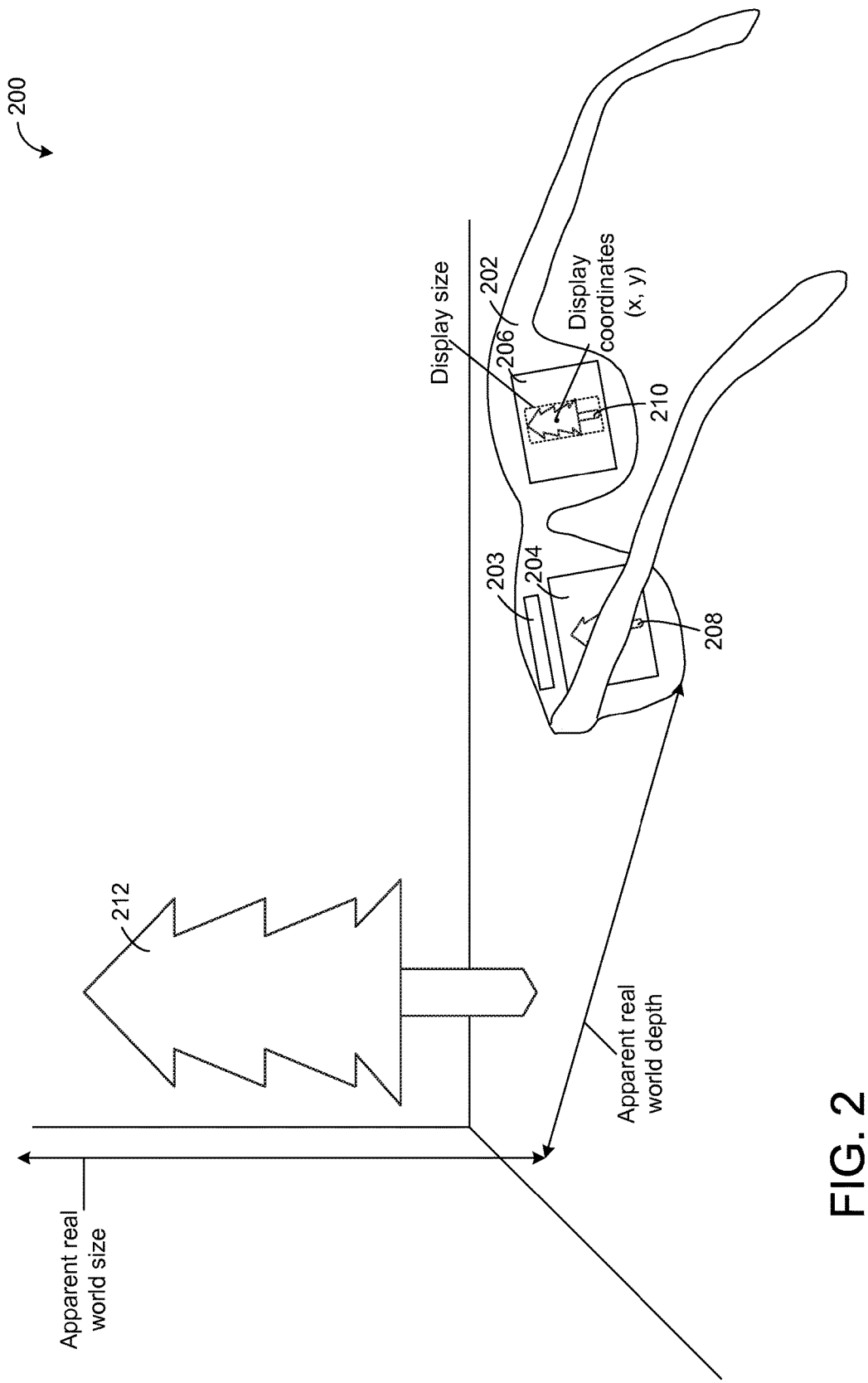
FIG. 2 schematically shows an example stereoscopic, near-eye, see-through display device.

FIG. 2 is a schematic view 200 showing aspects of a wearable stereoscopic display system 202 including a controller 203. The illustrated display system resembles ordinary eyewear and is one non-limiting example of HMD 104 of FIG. 1. The display system includes a right display 206 and a left display 204. In some embodiments, the right and left displays are wholly or partly transparent from the perspective of the wearer, to give the wearer a clear view of his or her surroundings. This feature enables computerized display imagery to be admixed with imagery from the surroundings, for an illusion of augmented reality.

In some embodiments, display imagery is transmitted in real time to display system 202 from a remote computing system operatively coupled to display system 202 (not shown). The display imagery may be transmitted in any suitable form—viz., type of transmission signal and data structure. The signal encoding the display imagery may be carried over a wired or wireless communication link of any kind to controller 203 of the display system. In other embodiments, at least some of the display-image composition and processing may be enacted in the controller.

Continuing in FIG. 2, each of right and left displays includes a respective optical system, and controller 203 is operatively coupled to the right and left optical systems. In the illustrated embodiment, the controller is concealed within the display-system frame, along with the right and left optical systems. The controller may include suitable input/output (IO) componentry to enable it to receive display imagery from the remote computing system. The controller may also include position-sensing componentry—e.g., a global-positioning system (GPS) receiver, a gyroscopic sensor or accelerometer to assess head orientation and/or movement, etc. When display system 202 is in operation, controller 203 sends appropriate control signals to the right optical system which cause the right optical system to form a right display image in right display 206. Likewise, the controller sends appropriate control signals to the left optical system which cause the left optical system to form a left display image in left display 204. The wearer of the display system views the right and left display images through the right and left eyes, respectively. When the right and left display images are composed and presented in an appropriate manner (vide infra), the wearer experiences the illusion of an augmented reality object at a specified position, and having specified 3D content and other display properties. It will be understood that an 'augmented reality object', as used herein, may be an object of any desired complexity and need not be limited to a singular object. Rather, an augmented reality object may comprise a complete virtual scene having both foreground and background portions. An augmented reality object may also correspond to a portion or locus of a larger augmented reality object.

As shown in FIG. 2, left display 204 and right display 206 (also referred to herein as left-eye display and right-eye display) are each displaying a respective augmented reality image (i.e., an image of a tree). Left display 204 is displaying left augmented reality image 208 and right display 206 is displaying right augmented reality image 210. Each of left display 204 and right display 206 may comprise a suitable display, such as an LCD display, configured to form a display image based on the control signals from controller 203. Each display includes a plurality of individual, addressable pixels arranged on a rectangular grid or other geometry. Each of left display 204 and right display 206 may further comprise optics for delivering the displayed image to the eyes. Such optics may include waveguides, beam splitters, partially reflective mirrors, etc.

Collectively, the left augmented reality image 208 and right augmented reality image 210 create augmented reality object 212 when viewed by a wearer of the display system 202. While left augmented reality image 208 and right augmented reality image 210 are depicted in FIG. 2 as being identical, it is to be understood that each of the left and right augmented reality images may be the same, or each may be different (e.g., each may comprise an image of the same object, but from slightly different perspectives). The augmented reality object 212 has an apparent real world size and an apparent real world depth determined by the size and location of each of the left augmented reality image 208 and right augmented reality image 210 on its respective display.

The apparent location, including apparent real world depth (i.e., z coordinate), apparent real world lateral position (i.e., x coordinate), and apparent real world vertical coordinate (i.e., y coordinate) of the augmented reality object 212 may be dictated by the display coordinates for each of the left and right augmented reality images 208, 210. The apparent size may be dictated by the display size and the apparent depth for that object. As used herein, the display coordinates of an augmented reality image include the x, y location of each pixel comprising the augmented reality image. The display size of an augmented reality image is a length measurement in one or more dimensions as dictated by the number of pixels comprising the augmented reality image, e.g., the proportion of the display taken up by the augmented reality image. Further, as used herein, augmented reality image refers to an actual image displayed on a display, while augmented reality object refers to the augmented reality content perceived by the wearer of the display system, when the wearer views both the right and left displays. It is to be understood that an augmented reality object may comprise any suitable augmented reality content, including but not limited to graphical user interfaces, user interface control elements, virtual user markings, holograms, animations, video simulations, and the like.

To adjust the apparent real world depth of the augmented reality object, the right display coordinates and/or left display coordinates may be set relative to each other. For example, to decrease the apparent real world depth of an augmented reality object, the left and right display coordinates may be set to be closer to each other. As an example, the tree image may move towards the nose on the left and right displays. To increase the apparent real world depth of an augmented reality object, the left and right display coordinates may be set to be farther from each other. As an example, the tree image may move away from the nose on the left and right displays.

To adjust the apparent real world size of an augmented reality object, the right display size and/or left display size may be adjusted. For example, the right and/or left display sizes may be increased to increase the apparent real world size of an augmented reality object. However, as will be explained in more detail below, the apparent real world size of an augmented reality object may be the size of the augmented reality object relative to other, real objects at the same apparent depth. As such, in some examples, the apparent real world size of the augmented reality object may scale as a function of the apparent real world depth.

The scaling of augmented reality object size (and hence scaling of respective augmented reality image display size) as a function of apparent real world depth may be carried out according to a desired scaling function, which will be explained in more detail below. Briefly, each scaling function may set left and right display coordinates relative to each other to set an augmented reality object at a desired apparent real world depth as well as scale one or more aspects of augmented reality image display size based on the apparent real world depth. Each function may perform the scaling differentially, such as linearly, non-linearly, scale only within a specified range of depths, or other suitable function.

In one example scaling function, augmented reality image display size may be scaled linearly with changing apparent real world depth outside a non-scaling range of apparent real world depths, while within the non-scaling range of apparent real world depths, augmented reality image display size may be maintained. In doing so, the apparent real world size of the augmented reality object may change with changing apparent real world depth such that the augmented reality object stays at a constant proportion of the field of view of the wearer of the display system.

Figure 3:
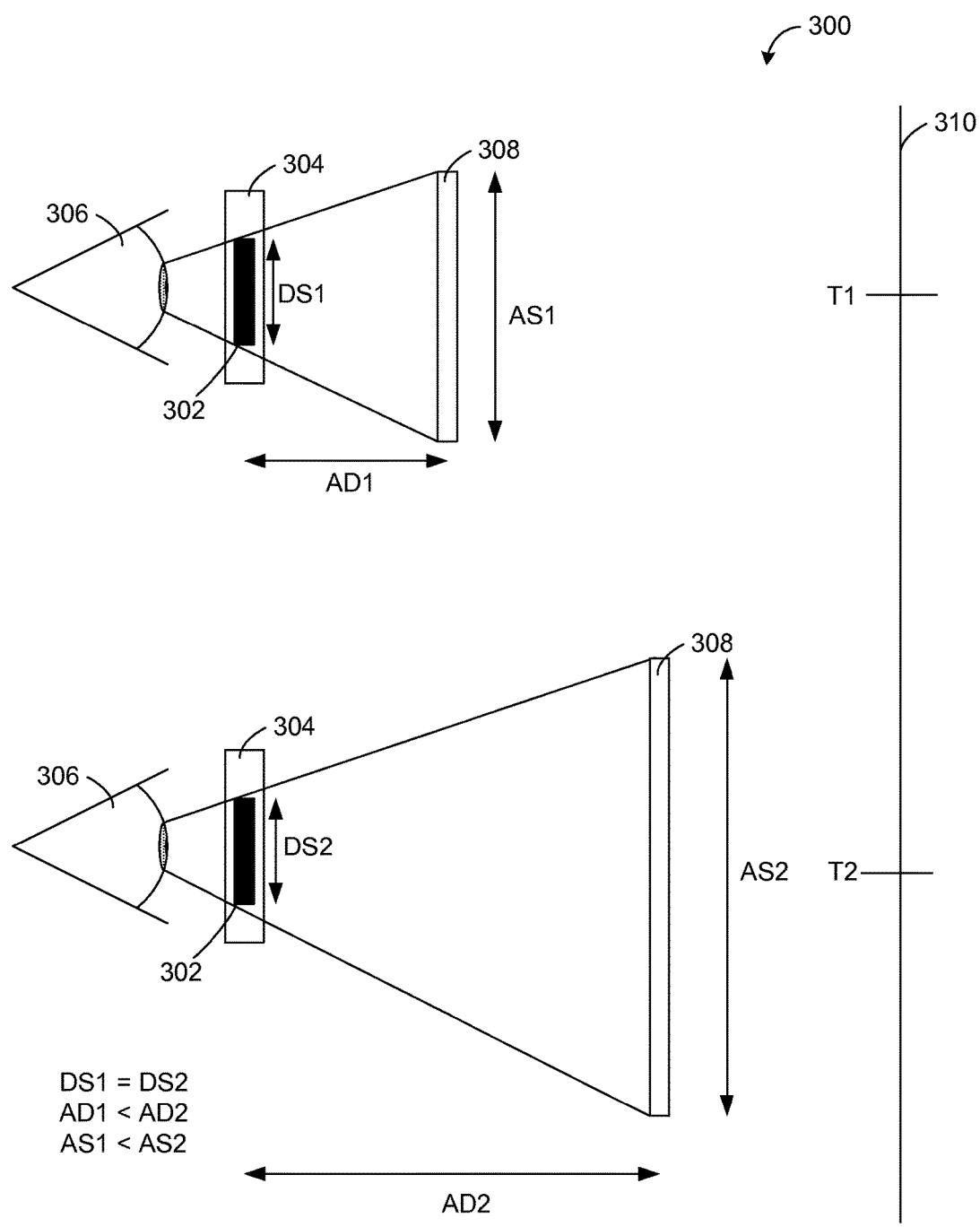
FIG. 3 is a diagram schematically illustrating example apparent real world size and depth for an augmented reality object scaled according to a first scaling function.

FIG. 3 is a diagram 300 schematically illustrating example apparent real world size and depth for an augmented reality object scaled according to a first scaling function. An augmented reality image 302 is displayed on a near-eye, see-through display 304, such as a display included in HMD 104 of FIG. 1 and/or display system 202 of FIG. 2. When viewed by eyes of a user 306, the augmented reality image 302 appears to be an augmented reality object 308. While only one augmented reality image is depicted in FIG. 3, it is to be understood that display 304 may include two displays, each displaying respective augmented reality images. FIG. 3 also includes a timeline 310.

At a first point in time, T1, the augmented reality image 302 is displayed with a first display size, DS1, and with display coordinates that set the augmented reality object at a first apparent depth, AD1. Due to the display size and apparent depth, the augmented reality object has a first apparent size, AS1.

At a second point in time, T2, the apparent depth of the augmented reality object is increased, as shown by apparent depth AD2. The first scaling function applied in the example of FIG. 3 specifies that the display size of the augmented reality image 302 be maintained while apparent depth changes, and thus the display size DS2 is equal to the display size DS1 of time T1. However, because the apparent depth has increased while the display size has stayed the same, the apparent size of the augmented reality object 308 increases, as shown by apparent size AS2. As will be appreciated by FIG. 3, the relative proportion of the field of view of the user taken up by the augmented reality image, and the augmented reality object, remains constant from time T1 to time T2.

Figure 4:
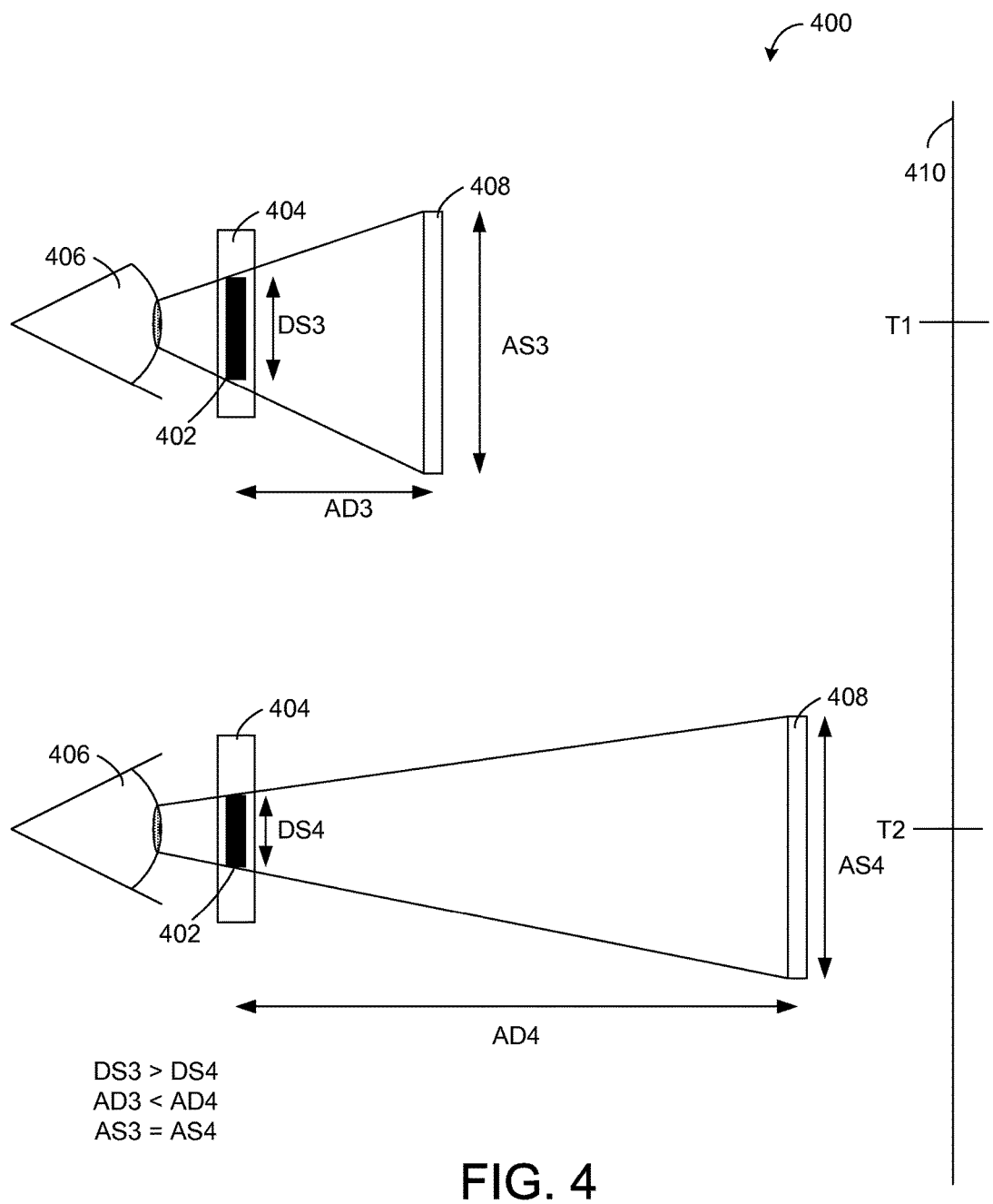
FIG. 4 is a diagram schematically illustrating example apparent real world size and depth for an augmented reality object scaled according to a second scaling function.

FIG. 4 is a diagram 400 schematically illustrating example apparent real world size and depth for an augmented reality object scaled according to a second scaling function. Similar to FIG. 3, an augmented reality image 402 is displayed on a near-eye, see-through display 404, such as a display included in HMD 104 of FIG. 1 and/or display system 202 of FIG. 2. When viewed by eyes of a user 406, the augmented reality image 402 appears to be an augmented reality object 408. While only one augmented reality image is depicted in FIG. 4, it is to be understood that display 404 may include two displays, each displaying respective augmented reality images. FIG. 4 also includes a timeline 410.

At a first point in time, T1, the augmented reality image 402 is displayed with a third display size, DS3, and with display coordinates that set the augmented reality object at a third apparent depth, AD3. Due to the display size and apparent depth, the augmented reality object has a third apparent size, AS3. In the example shown in FIG. 4, the third display size DS3 is equal to the first display size DS1 of FIG. 3. Likewise, the third apparent depth AD3 and third apparent size AS3 are each equal to the first apparent depth AD1 and first apparent size AS1, respectively, of FIG. 3.

At a second point in time, T2, the apparent depth of the augmented reality object is increased, as shown by apparent depth AD4. The second scaling function applied in the example of FIG. 4 specifies that the display size of the augmented reality image 302 be scaled linearly with apparent depth. As such, the display size DS4 decreases relative to the display size DS3 at time T1. As a result, the apparent size of the augmented reality object 408 at time T2 stays the same, as shown by AS4. Thus, the apparent size of the augmented reality object at time T1, AS3, is equal to the apparent size AS4 at time T2. As will be appreciated by FIG. 4, the relative proportion of the field of view of the user taken up by the augmented reality image and augmented reality object decreases at time T2 relative to time T1.

Figure 5:
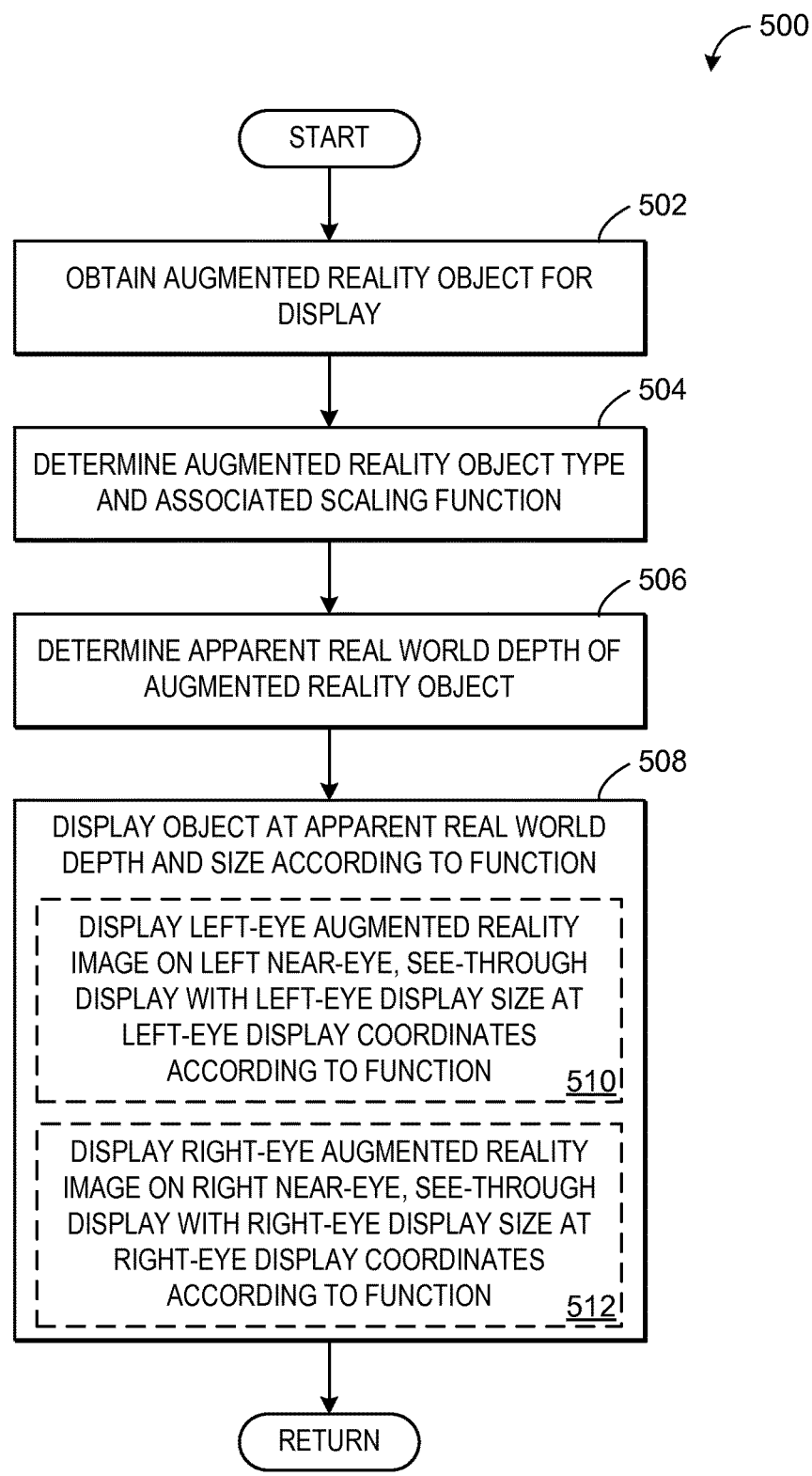
FIG. 5 is a flow chart illustrating a method for displaying an augmented reality object.
Figure 6A:
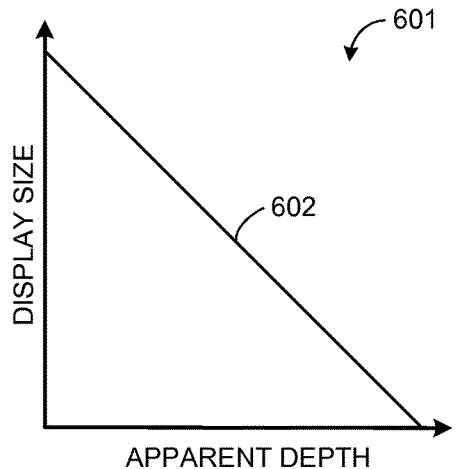
FIGS. 6A-6E are diagrams illustrating example scaling functions.
Figure 6B:
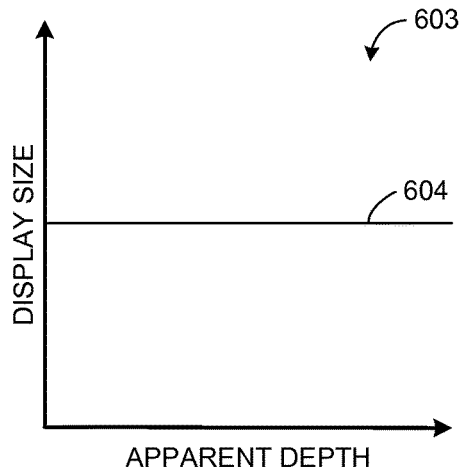
Figure 6C:
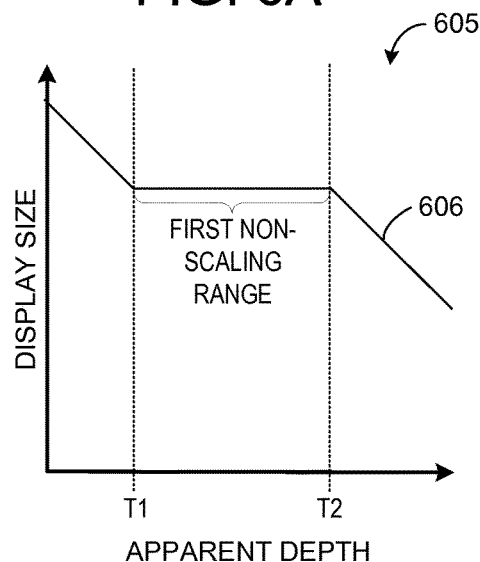
Figure 6D:
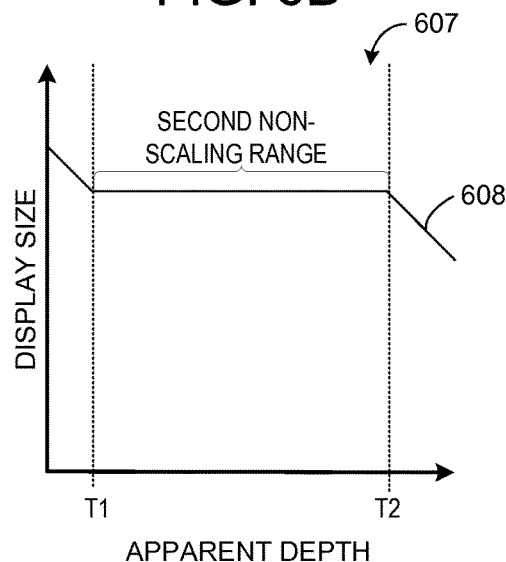
Figure 6E:
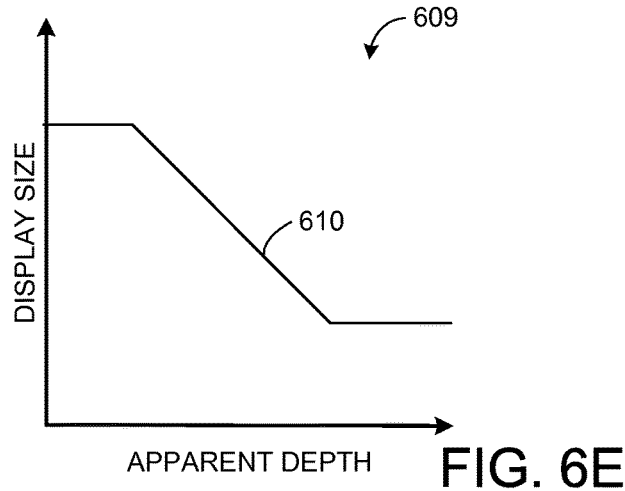

Turning now to FIG. 5, a method 500 for displaying an augmented reality object is illustrated. Method 500 may be enacted in a wearable, head-mounted stereoscopic display system, such as HMD 104 of FIG. 1 or display system 202 of FIG. 2 described hereinabove, or HMD 1200 of FIG. 12, described below.

At 502, method 500 includes obtaining an augmented reality object for display on the display system. The augmented reality object may include any suitable augmented reality content and may be displayed as part of a graphical user interface, game, guidance or assistance system, or any suitable augmented or immersive environment. The augmented reality object may be obtained from a remote service, from a memory of the display system, or other suitable source in response to user input, predetermined sequence of an executed game or other content, or other suitable action. As explained above, the augmented reality object may be comprised of a right-eye and left-eye augmented reality image, each configured to be displayed on respective right-eye and left-eye displays of the display system. Accordingly, obtaining the augmented reality object may include obtaining corresponding left-eye and right-eye augmented reality images.

At 504, the method includes determining an augmented reality object type and associated scaling function. The augmented reality object may be classified into one or more types of objects. Example types of augmented reality objects include graphical user interfaces, user interface control elements (e.g., cursors, arrows), virtual user markings (e.g., drawings), navigation and/or assistance icons, holograms, and other suitable types of augmented reality objects. Each type of augmented reality object may have an associated scaling function that dictates how the display sizes of the augmented reality images forming the augmented reality object scale as a function of the apparent real word depth of the augmented reality object.

At 506, the apparent real world depth of the augmented reality object is determined. The augmented reality object may be displayed at a suitable apparent real world depth. The apparent real world depth of the augmented reality object may be set according to one or more suitable parameters, including but not limited to user command (e.g., if a user issues a gesture, voice, or other command indicating the augmented reality object be placed at a given location), association with one or more real world objects, and preset parameters of the augmented reality object (e.g., the augmented reality object may have a preset depth selected to reduce eye strain of the user).

At 508, method 500 includes displaying the augmented reality object at the apparent real world depth and at an apparent real world size according to the scaling function. To display the augmented reality object, method 500 includes displaying a left-eye augmented reality image on a left near-eye, see-through display with a left-eye display size at left-eye display coordinates according to the scaling function, as indicated at 510. Further, method 500 includes displaying a right-eye augmented reality image on a right near-eye, see-through display with a right-eye display size at right-eye display coordinates according to the scaling function, as indicated at 512.

As explained previously, the apparent real world depth of the augmented reality object may be dictated by the respective right-eye and left-eye display coordinates. Then, the appropriate apparent real world size of the augmented reality object may be set as a function of the apparent real world depth, according to the scaling function. For example, the augmented reality object may have a default apparent real world size for a given apparent real world depth. The default size may be based on the type of augmented reality object, context and/or environment in which the augmented reality object is placed, user input, and/or other suitable factors. The scaling function may then alter this apparent real world size based on the determined real world depth. To adjust the apparent real world size, the right-eye and left-eye display sizes of the right-eye and left-eye augmented reality images may be adjusted, as explained above.

Example scaling functions that may be applied during execution of method 500 are illustrated in FIGS. 6A-6E. Each of diagrams 601, 603, 605, 607, and 609 plots augmented reality image display size as a function of apparent real world depth of the corresponding augmented reality object. The example functions may apply to one or more dimensions of an augmented reality image (e.g., height, or width, or height and width). The example functions may apply to another aspect of an augmented reality image, such as a line thickness.

A first linear function, illustrated by line 602, adjusts the display size linearly (e.g., 1:1) with changing apparent depth, throughout all apparent depths within visible range of a user. The first linear scaling function may be used to scale augmented reality objects that are intended to mimic elements within a user's environment, e.g., objects within a game environment. While a linear function such as the one illustrated by line 602 may accurately represent how an object changes in perceived size as the depth of the object changes, it may result in an object becoming too small to be accurately perceived or so large that it occludes the user's field of view.

Another example of a linear scaling function is illustrated by line 604. In this second linear scaling function, the display size of the augmented reality image remains constant regardless of apparent real world depth. While such an approach to sizing the augmented reality object may be simple to execute, it also suffers from the same issues as the first linear scaling function, e.g., the augmented reality object being too small or too large at some depths. Realism is also lessened, because augmented reality objects scaled in this manner do not mimic the scaling of real world objects.

To leverage the advantages of the linear scaling functions while avoiding the sizing issues described above, various segmented scaling functions may be applied. An example of a first segmented function is illustrated as line 606. Herein, the display size is maintained constant over a first non-scaling range of apparent depths, and adjusts linearly with changing depth at depths outside the first non-scaling range. Thus, according to the first non-linear scaling function, left-eye and right-eye display sizes are scaled as a function of apparent real world depth (e.g., decreasing size with increasing depth) until the apparent real world depth reaches a first threshold depth T1. The display sizes remain constant throughout the non-scaling range of depths until a second threshold depth T2 is reached. At depths beyond the first non-scaling range, the left-eye and right-eye display sizes are again scaled as a function of apparent real world depth.

The first segmented scaling function may be applied to scale augmented reality objects that do not necessarily correlate to real objects or the real world environment. This may include user interface control elements, such as cursors, graphical interfaces, and virtual user markings such as drawings. By maintaining the display size of the displayed augmented reality images, the apparent real world size of the augmented reality object may be smaller at lesser depths and greater at greater depths, thus occupying the same, constant proportion of the user's field of view throughout the first non-scaling range of depths. In doing so, the augmented reality object may be easily visualized and/or interacted with by the user, even at relatively far depths. Further, by scaling the display size as a function of depth outside the first non-scaling range, the first segmented scaling function prevents the augmented reality object from becoming too large and occluding the user's field of view.

A second segmented scaling function is illustrated by line 608. The second segmented scaling function is similar to the first segmented scaling function, and includes a second non-scaling range of depths between a first threshold depth T1 and a second threshold depth T2 where the display sizes of the augmented reality images are maintained at a constant size. The second non-scaling range of depths may be different than the first non-scaling range, e.g., the second non-scaling range may be a larger range of depths than the first non-scaling range.

A third segmented scaling function is illustrated by line 610. The third segmented scaling function linearly scales the display sizes of the augmented reality images as a function of depth within a scaling range of depths, but maintains the display sizes at one or more constant sizes outside the scaling range of depths. For example, the display sizes are maintained at a first, relatively large display size at close range depths, scale linearly in the scaling range of depths, and then are maintained at a second, relatively small display size at far range depths.

The example scaling functions described above may each be associated with a respective different type of augmented reality object and automatically applied each time the associated augmented reality object is displayed. In other examples, a respective scaling function may be applied to an augmented reality function in response to a user request or other input.

When more than one augmented reality object is displayed, each displayed augmented reality object may be scaled according to its respective scaling function. As a result, some augmented reality objects, when displayed together, may be scaled similarly, while other augmented reality objects may be scaled differently. As a specific example, a displayed object that is part of a game (e.g., a holographic tree, such as the one illustrated in FIG. 2) may scale linearly with changing depth at all apparent depths, to mimic how the object would be perceived in the real world. In contrast, a control object, such as a cursor used to control aspects of the game, may be scaled according to the first segmented scaling function to maintain visibility of the cursor.

Thus, in the example above, the left-eye display coordinates may be set relative to the right-eye display coordinates as a function of the apparent real world depths for both first and second augmented reality objects. An aspect (e.g., overall image size) of the left-eye display size and the right-eye display size may be maintained throughout a non-scaling range of apparent real world depths for only the first augmented reality object. The left-eye display size and the right-eye display size may be scaled with changing apparent real world depth for both the first and second augmented reality objects outside the non-scaling range of apparent real world depths. The left-eye display size and the right-eye display size may be scaled with changing apparent real world depth throughout the non-scaling range of apparent real world depths for only the second augmented reality object.

The scaling functions described above with respect to FIGS. 6A-6E are exemplary in nature, and other scaling functions may be used. Scaling functions having any number of constant, linear, or non-linear segments may be used. Different scaling segments of the same function may have different scaling properties. For example, the slope of a scaling segment before a constant segment may be greater than the slope of a scaling segment after the constant segment.

Other variations from the functions illustrated in FIGS. 6A-6E are contemplated. For example, the slope of the first linear function may be smaller or greater than illustrated. In another example, the first segmented scaling function may scale in size during the non-scaling range of depths, but at a much lower rate than outside the non-scaling range of depths. In doing so, the function may only scale a proportion of the necessary scale required to maintain the same angular size, blending both concerns of giving cues that the user is moving relative to the augmented reality object while at the same time mostly maintaining its angular size to allow the user to more easily view and interact with it. Further, the scaling functions may be user configurable in some examples.

Some scaling functions may have restrictions on the maximum and minimum apparent real world sizes, which would result in the angular size of an augmented reality object appearing to change if the user moves beyond the corresponding physical distances to the object. The scaling operations may be triggered by virtually any object positioning change, and are not restricted to only positioning due to collisions with other real world or augmented reality objects.

These scaling operations may either be applied continuously, periodically, or applied at a single point in time. For example, a floating user interface element may continuously update its apparent real world size to maintain its angular size (e.g., proportion of the user's field of view) based upon placement against a real world surface that the user is gazing at, while a line the user draws may size itself to maintain a target angular size based upon the distance to the target physical surface it is drawn upon, but then not change in world space size after that point.

Further, some scaling functions may adjust aspects of displayed augmented reality images alternative or in addition to image display size. For example, hue, color, transparency, lighting effects, and/or feature density of an augmented reality image may be adjusted based on apparent real world depth.

The example scaling functions were described above with respect to how the overall apparent real world size of the augmented reality object changes based on apparent real world depth. However, one or more specific aspects of the augmented reality object may be adjusted alternative to or in addition to the adjustment of the overall apparent real world size. One example aspect that may be adjusted is the line thickness of the augmented reality object, which is described in more detail below. Another example aspect that may be adjusted includes object orientation. For example, an augmented reality object, such as a book, may be easily visible when viewed head-on. However, when the user views the same object from a side angle (e.g., 90 degrees), the book is effectively impossible to read. Thus, the augmented reality object may be automatically rotated to face the user. This effect can be referred to as billboarding. Like the scaling effect, a billboarding effect may be keyed to apparent real world depth. For example, billboarding may be implemented only within a range of apparent real world depths.

Figure 7:
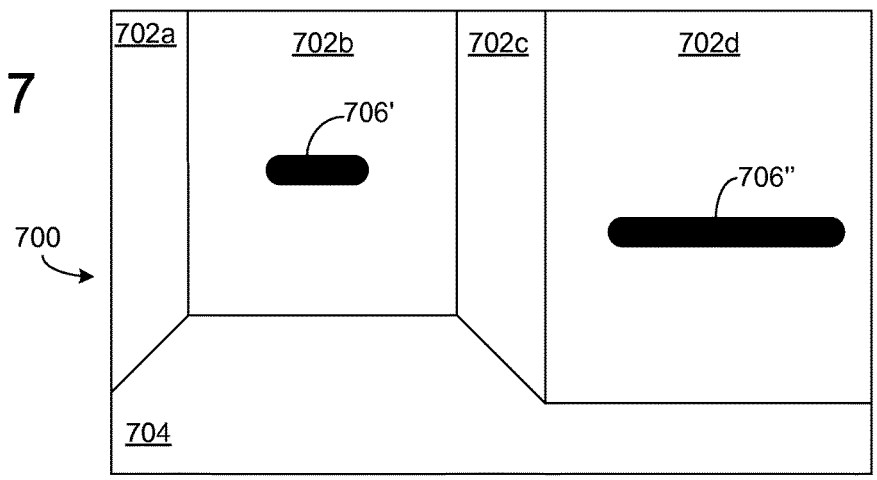
FIG. 7 schematically shows a first example view of an augmented reality object.

FIG. 7 shows an example view 700 through a near-eye, see-through display (e.g., HMD 104, display system 202) from the perspective of a user. In the view 700, the user can see real world walls 702*a*, 702*b*, 702*c*, 702*d*, and floor 704. In addition to the real world aspects of the surrounding environment, the user can see an augmented reality object of a first instance of a virtual user marking, herein depicted as horizontal line 706' on wall 702*b* and an augmented reality object of a second instance of the same horizontal line 706" on wall 702*d*.

In this example, horizontal line 706" is five feet away from the user and occupies a 0.95 degree vertical angular spread. The horizontal line 706" may appear to be one inch tall in world space coordinates. On the other hand, when ten feet from the user, the same horizontal line 706' may still occupy a 0.95 degree vertical angular spread but appear to be two inches tall in world space coordinates. In other words, the line occupies the same proportion of an HMD's field of view at different distances, and the line will have the same weight regardless of the apparent real world depth at which it is drawn. Maintaining the weight at different distances may make it easier for a user to perceive augmented reality lines at farther depths.

In some examples, the horizontal line length may be scaled as a function of depth. As shown, the perceived size of the horizontal line 706' is shorter than the perceived size of the horizontal line 706". However, in other examples the line length may be kept constant, similar to the line weight.

Figure 8:
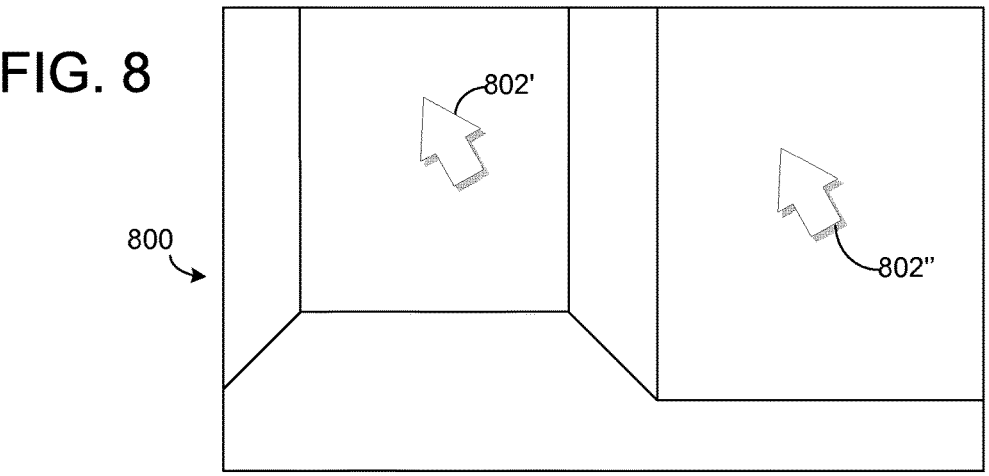
FIG. 8 schematically shows a second example view of an augmented reality object.

As another example, a user interface control element, herein depicted as a cursor, may be displayed according to a segmented scaling function, such as the first segmented scaling function described above. FIG. 8 shows a view 800 with a first instance of an augmented reality cursor 802' at a relatively far distance and a second instance of the same augmented reality cursor 802" at a relatively near distance. In both instances, the augmented reality cursor is maintained at the same proportion of the user's field of view. As explained above, to accomplish this, the segmented scaling function maintains the same display size for the left-eye and right-eye displays of the augmented reality images comprising the augmented reality cursor, at least throughout a non-scaling range of depths.

Figure 9:
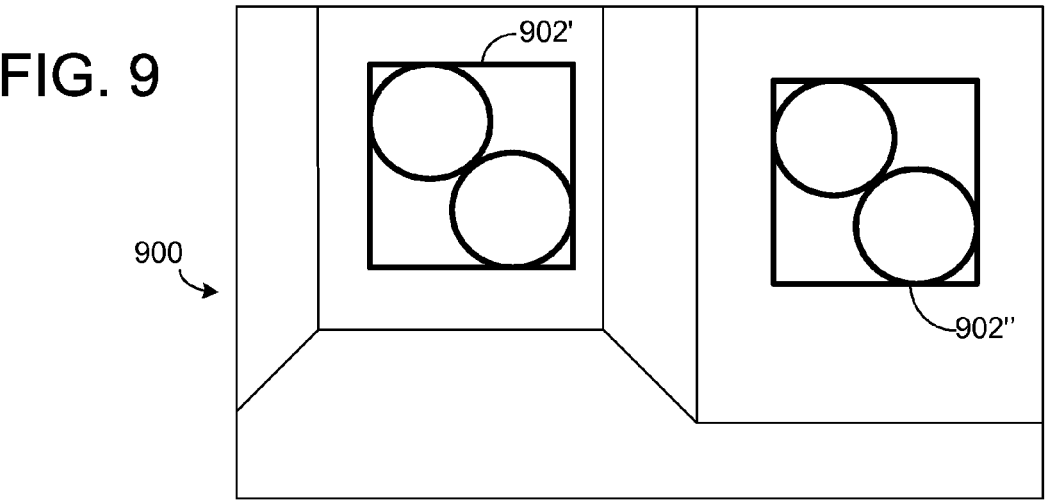
FIG. 9 schematically shows a third example view of an augmented reality object.

As a further example, the overall size of augmented reality objects comprising many constituent elements may be scaled so as to have a larger corresponding apparent real world size when at a relatively far distance and a smaller corresponding apparent real world size when at a relatively close distance. As an example, FIG. 9 shows view 900 with an augmented reality object of a first instance of a picture 902' at a relatively far distance and a second instance of the same picture 902" at a relatively near distance. The augmented reality objects are scaled so as to occupy the same proportion of an HMD's field of view at the different distances. As a result, picture 902' has a greater real world size than picture 902".

Figure 10:
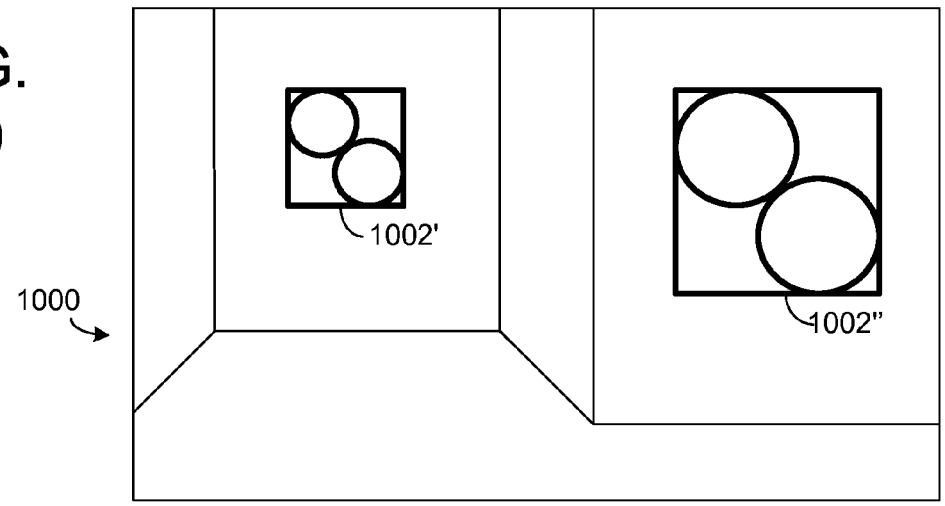
FIG. 10 schematically shows a fourth example view of an augmented reality object.

In some examples, an augmented reality object may be a parent object comprising multiple child objects (e.g., sub-objects). For example, the object illustrated in FIG. 9 includes a square frame with two circles contained inside the frame. In some examples, scaling functions may be applied differentially to different children of the parent augmented reality object. In this way, aspects of particular child objects may be scaled and/or maintained based on depth, while aspects of other child objects may not be scaled or maintained based on depth. In one example, the circles and the frame may be scaled based on depth while the thickness of the lines that is used to render these objects is maintained at the same display size, as illustrated in FIG. 10, described below. In this example, the overall size of an augmented reality object may remain the same relative to the surrounding environment, but one or more of the constituent elements may scale. For example, the overall size of an icon may appear to be smaller when displayed at a farther perceived distance, but the thickness of the lines making up the icon may appear the same at both near and far perceived distances.

As an example, FIG. 10 shows view 1000 with an augmented reality object of a first instance of a picture 1002' at a relatively far distance and a second instance of the same picture 1002" at a relatively near distance. The augmented reality objects are scaled such that the overall real world dimensions of the objects remain consistent at different distances. As such, the farther instance of picture 1002' occupies less of an HMD's field of view than the nearer instance of picture 1002". However, the constituent lines that make up the pictures are scaled so as to occupy the same proportion of the HMD's field of view at the different distances.

In some embodiments, the methods and processes described herein may be tied to a computing system of one or more computing devices. In particular, such methods and processes may be implemented as a computer application program or service, an application-programming interface (API), a library, and/or other computer-program product.

Figure 11:
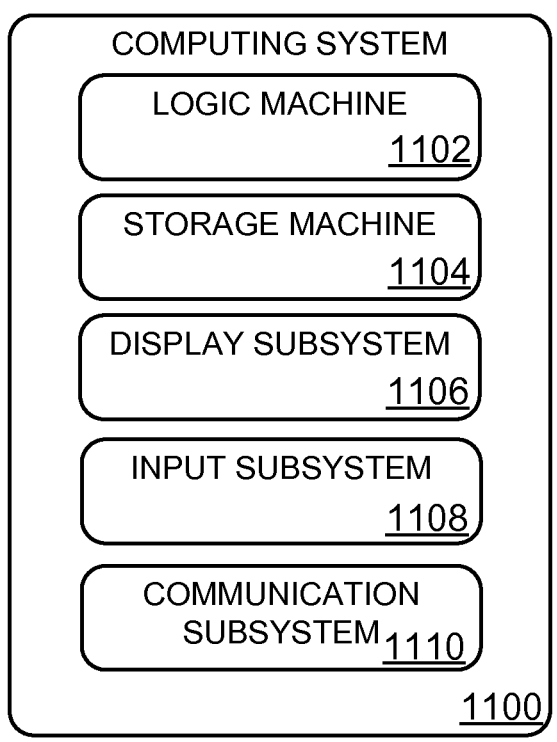
FIG. 11 shows an example computing system.

FIG. 11 schematically shows a non-limiting embodiment of a computing system 1100 that can enact one or more of the methods and processes described above. HMD 104 of FIG. 1, display system 202 of FIG. 2, and/or HMD 1200 of FIG. 12, described below, are non-limiting examples of computing system 1100. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic machine 1102 executing instructions held by storage machine 1104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

Figure 12:
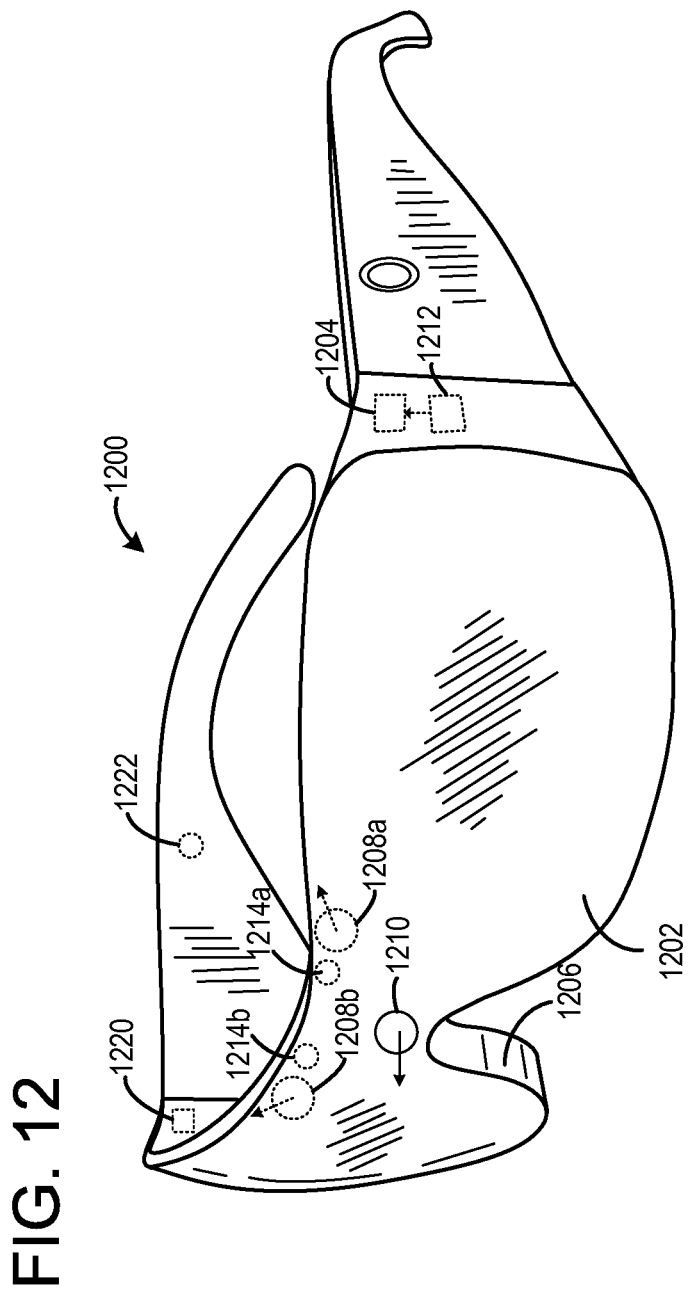
FIG. 12 shows an example head-mounted display device.

FIG. 12 shows a non-limiting example of a head-mounted, near-eye, see-through display system, also referred to as an HMD 1200, in the form of wearable glasses with a see-through display 1202. HMD 1200 is a non-limiting example of the HMD 104 of FIG. 1, the display system 202 of FIG. 2, and/or the computing system 1100 of FIG. 11. An HMD may take any other suitable form in which a transparent, semi-transparent, and/or non-transparent display is supported in front of a viewer's eye or eyes. Further, embodiments described herein may be used with any other suitable computing device, including but not limited to mobile computing devices, laptop computers, desktop computers, tablet computers, other wearable computers, etc. For example, an augmented reality image may be displayed on a mobile phone's display along with real world imagery captured by the mobile phone's camera.

The HMD 1200 includes a see-through display 1202 and a controller 1204. The see-through display 1202 may enable images such as augmented reality images (also referred to as holographic objects) to be delivered to the eyes of a wearer of the HMD. The see-through display 1202 may be configured to visually augment an appearance of a real-world, physical environment to a wearer viewing the physical environment through the transparent display. In one example, the display may be configured to display one or more UI objects of a graphical user interface. In some embodiments, the UI objects presented on the graphical user interface may be virtual objects overlaid in front of the real-world environment. Likewise, in some embodiments, the UI objects presented on the graphical user interface may incorporate elements of real-world objects of the real-world environment seen through the see-through display 1202. In other examples, the display may be configured to display one or more other graphical objects, such as virtual objects associated with games, videos, or other visual content.

Any suitable mechanism may be used to display images via the see-through display 1202. For example, the see-through display 1202 may include image-producing elements located within lenses 1206 (such as, for example, a see-through Organic Light-Emitting Diode (OLED) display). As another example, the see-through display 1202 may include a display device (such as, for example a liquid crystal on silicon (LCOS) device or OLED microdisplay) located within a frame of HMD 1200. In this example, the lenses 1206 may serve as, or otherwise include, a light guide for delivering light from the display device to the eyes of a wearer. Such a light guide may enable a wearer to perceive a 3D holographic image located within the physical environment that the wearer is viewing, while also allowing the wearer to directly view physical objects in the physical environment, thus creating a mixed reality environment. Additionally or alternatively, the see-through display 1202 may present left-eye and right-eye augmented reality images via respective left-eye and right-eye displays, as discussed above with respect to FIG. 2.

The HMD 1200 may also include various sensors and related systems to provide information to the controller 1204. Such sensors may include, but are not limited to, one or more inward facing image sensors 1208a and 1208b, one or more outward facing image sensors 1210, an inertial measurement unit (IMU) 1212, and one or more microphones 1220. The one or more inward facing image sensors 1208a, 208b may be configured to acquire image data in the form of gaze tracking data from a wearer's eyes (e.g., sensor 208a may acquire image data for one of the wearer's eye and sensor 1208b may acquire image data for the other of the wearer's eye). The HMD may be configured to determine gaze directions of each of a wearer's eyes in any suitable manner based on the information received from the image sensors 1208a, 1208b. For example, one or more light sources 1214a, 1214b, such as infrared light sources, may be configured to cause a glint of light to reflect from the cornea of each eye of a wearer. The one or more image sensors 1208a, 1208b may then be configured to capture an image of the wearer's eyes. Images of the glints and of the pupils as determined from image data gathered from the image sensors 1208a, 1208b may be used by the controller 1204 to determine an optical axis of each eye. Using this information, the controller 1204 may be configured to determine a direction the wearer is gazing. The controller 1204 may be configured to additionally determine an identity of a physical and/or virtual object at which the wearer is gazing by projecting the user's gaze vector onto a 3D model of the surrounding environment.

The one or more outward facing image sensors 1210 may be configured to measure physical environment attributes of the physical environment in which the HMD 1200 is located (e.g., light intensity). Data from the outward facing image sensors 1210 may be used to detect movements within a field of view of the display 1202, such as gesture-based inputs or other movements performed by a wearer or by a person or physical object within the field of view. In one example, data from the outward facing image sensors 1210 may be used to detect a selection input performed by the wearer of the HMD, such as a gesture (e.g., a pinching of fingers, closing of a fist, etc.), that indicates selection of a UI object displayed on the display device. Data from the outward facing sensors may also be used to determine direction/location and orientation data (e.g. from imaging environmental features) that enables position/motion tracking of the HMD 1200 in the real-world environment. Data from the outward facing camera also may be used to construct still images and/or video images of the surrounding environment from the perspective of the HMD 1200.

The IMU 1212 may be configured to provide position and/or orientation data of the HMD 1200 to the controller 1204. In one embodiment, the IMU 1212 may be configured as a three-axis or three-degree of freedom (3DOF) position sensor system. This example position sensor system may, for example, include three gyroscopes to indicate or measure a change in orientation of the HMD 1200 within 3D space about three orthogonal axes (e.g., roll, pitch, and yaw). The orientation derived from the sensor signals of the IMU may be used to display, via the see-through display, one or more AR images with a realistic and stable position and orientation.

In another example, the IMU 1212 may be configured as a six-axis or six-degree of freedom (6DOF) position sensor system. Such a configuration may include three accelerometers and three gyroscopes to indicate or measure a change in location of the HMD 1200 along three orthogonal spatial axes (e.g., x, y, and z) and a change in device orientation about three orthogonal rotation axes (e.g., yaw, pitch, and roll). In some embodiments, position and orientation data from the outward facing image sensors 1210 and the IMU 1212 may be used in conjunction to determine a position and orientation of the HMD 1200.

The HMD 1200 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

Continuing with FIG. 12, the controller 1204 may be configured to record multiple eye gaze samples over time based on information detected by the one or more inward facing image sensors 1208a, 1208b. For each eye gaze sample, eye tracking information and, in some embodiments, head tracking information (from image sensors 1210 and/or IMU 1212) may be used to estimate an origin point and a direction vector of that eye gaze sample to produce an estimated location at which the eye gaze intersects the see-through display. Examples of eye tracking information and head tracking information used to determine an eye gaze sample may include an eye gaze direction, head orientation, eye gaze velocity, eye gaze acceleration, change in angle of eye gaze direction, and/or any other suitable tracking information. In some embodiments, eye gaze tracking may be recorded independently for both eyes of the wearer of the HMD 1200.

Controller 1204 may be configured to generate or update a three-dimensional model of a surrounding environment using information from outward facing image sensors 1210. Additionally or alternatively, information from outward facing image sensors 1210 may be communicated to a remote computer responsible for generating and/or updating a model of the surrounding environment. It either case, the relative position and/or orientation of the HMD relative to the surrounding environment may be assessed so that augmented reality images may be accurately displayed in desired real world locations with desired orientations.

As mentioned above, the HMD 1200 may also include one or more microphones, such as microphone 1220, that capture audio data. In some examples, the one or more microphones 1220 may comprise a microphone array including two or more microphones. For example, the microphone array may include four microphones, two positioned above the right lens and two positioned above the left lens of the HMD. Further, audio outputs may be presented to the wearer via one or more speakers, such as speaker 1222.

The controller 1204 may include a logic machine and a storage machine, discussed in more detail above with respect to FIG. 11, in communication with the display and the various sensors of the HMD.

An example wearable, head-mounted display system comprises a left near-eye, see-through display configured to display a left-eye augmented reality image with a left-eye display size at left-eye display coordinates, a right near-eye, see-through display configured to display a right-eye augmented reality image with a right-eye display size at right-eye display coordinates, the left-eye augmented reality image and right-eye augmented reality image collectively forming an augmented reality object perceivable at an apparent real world depth by a wearer of the head-mounted display system, and a controller. The controller sets the left-eye display coordinates relative to the right-eye display coordinates as a function of the apparent real world depth of the augmented reality object, the function maintaining an aspect of the left-eye display size and the right-eye display size throughout a non-scaling range of apparent real world depths of the augmented reality object, and the function scaling the left-eye display size and the right-eye display size with changing apparent real world depth of the augmented reality object outside the range of apparent real world depths. Such an example additionally or alternatively includes wherein the augmented reality object comprises virtual user markings. Such an example additionally or alternatively includes wherein maintaining the aspect of the left-eye display size and the right-eye display size comprises maintaining a line thickness of the virtual user markings throughout the non-scaling range. Such an example additionally or alternatively includes scaling a line length of the virtual user markings as a function of apparent real world depth throughout the non-scaling range. Such an example additionally or alternatively includes wherein the function decreases a distance between the left-eye display coordinates and the right-eye display coordinates with decreasing apparent real world depth. Such an example additionally or alternatively includes wherein maintaining the aspect of the left-eye display size and the right-eye display size throughout the non-scaling range of apparent real world depths comprises changing an apparent real world size of a corresponding aspect of the augmented reality object throughout the non-scaling range of apparent real world depths, such that the augmented reality object occupies a constant proportion of the wearer's field of view. Such an example additionally or alternatively includes wherein the augmented reality object comprises a user interface control element. Such an example additionally or alternatively includes wherein the function decreases the left-eye display size and the right-eye display size at apparent real world depths greater than the non-scaling range, and increases the left-eye display size and the right-eye display size at apparent real world depths less than the non-scaling range. Such an example additionally or alternatively includes wherein the augmented reality object is a first augmented reality object, and wherein the controller sets left-eye coordinates of a second augmented reality object relative to right-eye coordinates of the second augmented reality object as a second function of apparent real world depth of the second augmented reality object. Such an example additionally or alternatively includes wherein the second function maintains an aspect of a left-eye display size and a right-eye display size of the second augmented reality object throughout a second, different non-scaling range of apparent real world depths of the second augmented reality object. Such an example additionally or alternatively includes wherein the augmented reality object is a child object of a parent augmented reality object, and wherein the function scales a left-eye display size and a right-eye display size of the parent augmented reality object with changing apparent real world depth of the parent augmented reality object throughout the non-scaling range of apparent real world depths of the parent augmented reality object. Any or all of the above-described examples may be combined in any suitable manner in various implementations.

Another example provides a method for a wearable, head-mounted display system comprising displaying, on a left near-eye, see-through display, a left-eye augmented reality image with a left-eye display size at left-eye display coordinates according to a scaling function, displaying, on a right near-eye, see-through display, a right-eye augmented reality image with a right-eye display size at right-eye display coordinates according to the scaling function, the left-eye augmented reality image and right-eye augmented reality image collectively forming an augmented reality object perceivable at an apparent real world depth by a wearer of the head-mounted display system, the scaling function setting the left-eye display coordinates relative to the right-eye display coordinates as a function of the apparent real world depth of the augmented reality object, the scaling function maintaining an aspect of the left-eye display size and the right-eye display size throughout a non-scaling range of apparent real world depths of the augmented reality object, and the scaling function scaling the left-eye display size and the right-eye display size with changing apparent real world depth of the augmented reality object outside the non-scaling range of real world depths. Such an example additionally or alternatively includes wherein scaling the left-eye display size and the right-eye display size with changing apparent real world depth of the augmented reality object outside the non-scaling range comprises increasing the left-eye display size and the right-eye display size with decreasing apparent real world depth and decreasing the left-eye display size and right-eye display size with increasing apparent real world depth outside the non-scaling range of real world depths. Such an example additionally or alternatively includes wherein maintaining an aspect of the left-eye display size and the right-eye display size throughout the non-scaling range comprises maintaining the augmented reality object as a constant proportion of a field of view of the wearer throughout the non-scaling range. Such an example additionally or alternatively includes wherein maintaining the augmented reality object as a constant proportion of the field of view of the wearer comprises changing a real world size of the augmented reality object relative to real world objects at a same depth of the augmented reality object as the apparent real world depth of the augmented reality object changes. Such an example additionally or alternatively includes wherein the augmented reality object comprises a virtual user marking, and wherein maintaining an aspect of the left-eye display size and the right-eye display size throughout a non-scaling range of apparent real world depths comprises maintaining a line thickness of the virtual user marking. Any or all of the above-described examples may be combined in any suitable manner in various implementations.

Another example provides for a wearable, head-mounted display system comprising a left near-eye, see-through display configured to display a first left-eye augmented reality image and a second left-eye augmented reality image, the first and second left-eye augmented reality images displayed with different left-eye display sizes at different left-eye display coordinates, a right near-eye, see-through display configured to display a first right-eye augmented reality image and a second right-eye augmented reality image, the first and second right-eye augmented reality images displayed with different right-eye display sizes at different right-eye display coordinates, the first left-eye and first right-eye augmented reality images collectively forming a first augmented reality object, the second left-eye and second right-eye augmented reality images collectively forming a second augmented reality object, the first and second augmented reality objects perceivable at respective apparent real world depths by a wearer of the head-mounted display system, and a controller to set the left-eye display coordinates relative to the right-eye display coordinates as a function of the apparent real world depths for both the first and second augmented reality objects, the function maintaining an aspect of the left-eye display size and the right-eye display size throughout a non-scaling range of apparent real world depths for only the first augmented reality object, the function scaling the left-eye display size and the right-eye display size with changing apparent real world depth for both the first and second augmented reality objects outside the non-scaling range of apparent real world depths, and the function scaling the left-eye display size and the right-eye display size with changing apparent real world depth throughout the non-scaling range of apparent real world depths for only the second augmented reality object. Such an example additionally or alternatively includes wherein the first augmented reality object comprises a user interface control element, and wherein the second augmented reality object comprises a holographic game element. Such an example additionally or alternatively includes wherein the first augmented reality object is a child of the second augmented reality object. Such an example additionally or alternatively includes wherein the function includes a first, segmented function applied to the first augmented reality object and a second, linear function applied to the second augmented reality object. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof. cm The invention claimed is:

The invention claimed is:

1. A wearable, head-mounted display system comprising:
  a left near-eye, see-through display configured to display a left-eye augmented reality image with a left-eye display size at left-eye display coordinates;
  a right near-eye, see-through display configured to display a right-eye augmented reality image with a right-eye display size at right-eye display coordinates, the left-eye augmented reality image and right-eye augmented reality image collectively forming an augmented reality object perceivable at an apparent real world depth by a wearer of the head-mounted display system; and
  a controller to set the left-eye display coordinates relative to the right-eye display coordinates as a function of the apparent real world depth of the augmented reality object, the function maintaining an aspect of the left-eye display size and the right-eye display size throughout a non-scaling range of apparent real world depths of the augmented reality object, and the function scaling the left-eye display size and the right-eye display size with changing apparent real world depth of the augmented reality object outside the range of apparent real world depths.

2. The display system of claim 1, wherein the augmented reality object comprises virtual user markings.

3. The display system of claim 2, wherein maintaining the aspect of the left-eye display size and the right-eye display size comprises maintaining a line thickness of the virtual user markings throughout the non-scaling range.

4. The display system of claim 3, further comprising scaling a line length of the virtual user markings as a function of apparent real world depth throughout the non-scaling range.

5. The display system of claim 1, wherein the function decreases a distance between the left-eye display coordinates and the right-eye display coordinates with decreasing apparent real world depth.

6. The display system of claim 1, wherein maintaining the aspect of the left-eye display size and the right-eye display size throughout the non-scaling range of apparent real world depths comprises changing an apparent real world size of a corresponding aspect of the augmented reality object throughout the non-scaling range of apparent real world depths, such that the augmented reality object occupies a constant proportion of the wearer's field of view.

7. The display system of claim 1, wherein the augmented reality object comprises a user interface control element.

8. The display system of claim 1, wherein the function decreases the left-eye display size and the right-eye display size at apparent real world depths greater than the non-scaling range, and increases the left-eye display size and the right-eye display size at apparent real world depths less than the non-scaling range.

9. The display system of claim 1, wherein the augmented reality object is a first augmented reality object, and wherein the controller sets left-eye coordinates of a second augmented reality object relative to right-eye coordinates of the second augmented reality object as a second function of apparent real world depth of the second augmented reality object.

10. The display system of claim 9, wherein the second function maintains an aspect of a left-eye display size and a right-eye display size of the second augmented reality object throughout a second, different non-scaling range of apparent real world depths of the second augmented reality object.

11. The display system of claim 1, wherein the augmented reality object is a child of a parent augmented reality object, and wherein the function scales a left-eye display size and a right-eye display size of the parent augmented reality object with changing apparent real world depth of the parent augmented reality object throughout the non-scaling range of apparent real world depths of the parent augmented reality object.

12. A method for a wearable, head-mounted display system comprising:
displaying, on a left near-eye, see-through display, a left-eye augmented reality image with a left-eye display size at left-eye display coordinates according to a scaling function;
displaying, on a right near-eye, see-through display, a right-eye augmented reality image with a right-eye display size at right-eye display coordinates according to the scaling function, the left-eye augmented reality image and right-eye augmented reality image collectively forming an augmented reality object perceivable at an apparent real world depth by a wearer of the head-mounted display system;
the scaling function setting the left-eye display coordinates relative to the right-eye display coordinates as a function of the apparent real world depth of the augmented reality object;
the scaling function maintaining an aspect of the left-eye display size and the right-eye display size throughout a non-scaling range of apparent real world depths of the augmented reality object; and
the scaling function scaling the left-eye display size and the right-eye display size with changing apparent real world depth of the augmented reality object outside the non-scaling range of real world depths.

13. The method of claim 12, wherein scaling the left-eye display size and the right-eye display size with changing apparent real world depth of the augmented reality object outside the non-scaling range comprises increasing the left-eye display size and the right-eye display size with decreasing apparent real world depth and decreasing the left-eye display size and right-eye display size with increasing apparent real world depth outside the non-scaling range of real world depths.

14. The method of claim 12, wherein maintaining an aspect of the left-eye display size and the right-eye display size throughout the non-scaling range comprises maintaining the augmented reality object as a constant proportion of a field of view of the wearer throughout the non-scaling range.

15. The method of claim 14, wherein maintaining the augmented reality object as a constant proportion of the field of view of the wearer comprises changing a real world size of the augmented reality object relative to real world objects at a same depth of the augmented reality object as the apparent real world depth of the augmented reality object changes.

16. The method of claim 12, wherein the augmented reality object comprises a virtual user marking, and wherein maintaining an aspect of the left-eye display size and the right-eye display size throughout a non-scaling range of apparent real world depths comprises maintaining a line thickness of the virtual user marking.

17. A wearable, head-mounted display system comprising:
a left near-eye, see-through display configured to display a first left-eye augmented reality image and a second left-eye augmented reality image, the first and second left-eye augmented reality images displayed with different left-eye display sizes at different left-eye display coordinates;
a right near-eye, see-through display configured to display a first right-eye augmented reality image and a second right-eye augmented reality image, the first and second right-eye augmented reality images displayed with different right-eye display sizes at different right-eye display coordinates, the first left-eye and first right-eye augmented reality images collectively forming a first augmented reality object, the second left-eye and second right-eye augmented reality images collectively forming a second augmented reality object, the first and second augmented reality objects perceivable at respective apparent real world depths by a wearer of the head-mounted display system; and
a controller to set the left-eye display coordinates relative to the right-eye display coordinates as a function of the apparent real world depths for both the first and second augmented reality objects,
the function maintaining an aspect of the left-eye display size and the right-eye display size throughout a non-scaling range of apparent real world depths for only the first augmented reality object,
the function scaling the left-eye display size and the right-eye display size with changing apparent real world depth for both the first and second augmented reality objects outside the non-scaling range of apparent real world depths, and the function scaling the left-eye display size and the right-eye display size with changing apparent real world depth throughout the non-scaling range of apparent real world depths for only the second augmented reality object.

18. The display system of claim 17, wherein the first augmented reality object comprises a user interface control element, and wherein the second augmented reality object comprises a holographic game element.

19. The display system of claim 17, wherein the first augmented reality object is a child of the second augmented reality object.

20. The display system of claim 17, wherein the function includes a first, segmented function applied to the first augmented reality object and a second, linear function applied to the second augmented reality object.

* * * * *